(12) United States Patent
Hirano (10) Patent No.: US 10,495,038 B2
(45) Date of Patent: Dec. 3, 2019

(54) ARRANGEMENT STRUCTURE FOR VEHICLE DEVICES

(71) Applicant: TOYOTA JIDOSHA KABUSHIKI KAISHA, Toyota-shi, Aichi-ken (JP)

(72) Inventor: Yu Hirano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/107,371

(22) Filed: Aug. 21, 2018

(65) Prior Publication Data

US 2019/0113011 A1 Apr. 18, 2019

(30) Foreign Application Priority Data

Oct. 13, 2017 (JP) ................ 2017-199555

(51) Int. Cl.

| F02M 35/16 | (2006.01) |
|---|---|
| F02M 35/04 | (2006.01) |
| F02M 35/10 | (2006.01) |
| F02M 35/02 | (2006.01) |
| B60K 11/06 | (2006.01) |

(52) U.S. Cl.
CPC ........ F02M 35/161 (2013.01); F02M 35/048 (2013.01); B60K 11/06 (2013.01); *F02M 35/0201* (2013.01); *F02M 35/10013* (2013.01)

(58) Field of Classification Search
CPC .. B60K 13/02; F02M 35/04; F02M 35/10013; F02M 35/048; F02M 35/161; F02M 35/024; F02M 35/0201; F02M 35/02; F02M 35/14; F01N 3/021

See application file for complete search history.

(56) References Cited

U.S. PATENT DOCUMENTS

| 2005/0039024 | A1* | 2/2005 | Stemm | B62D 25/12 |
| | | | | 713/182 |
| 2005/0155806 | A1* | 7/2005 | Kanehira | B60K 11/04 |
| | | | | 180/291 |
| 2005/0217625 | A1* | 10/2005 | Niaken | F02M 35/0203 |
| | | | | 123/184.21 |
| 2006/0220405 | A1* | 10/2006 | Ohe | B60R 16/04 |
| | | | | 296/37.1 |
| 2013/0146378 | A1* | 6/2013 | Shigematsu | B60K 13/02 |
| | | | | 180/68.3 |

FOREIGN PATENT DOCUMENTS

| JP | H06-239148 A | 8/1994 |
| JP | 2005-205973 A | 8/2005 |

* cited by examiner

*Primary Examiner* — Long T Tran
(74) *Attorney, Agent, or Firm* — Oliff PLC (57) ABSTRACT

An arrangement structure for devices in a power unit chamber of a vehicle includes an air cleaner disposed in the power unit chamber; a battery disposed adjacently to and behind the air cleaner in the vehicle; and a cover disposed above the battery and the air cleaner. The front end of the cover is located further forward of the vehicle than the rear end of the air cleaner, and the minimum dimension of a space between the cover and the air cleaner is greater than the height of the battery.

9 Claims, 6 Drawing Sheets

ARRANGEMENT STRUCTURE FOR VEHICLE DEVICES

CROSS REFERENCE TO RELATED APPLICATION

The entire disclosure of Japanese Patent Application No. 2017-199555 filed on Oct. 13, 2017, including the specification, claims, drawings, and abstract is incorporated herein by reference in its entirety.

TECHNICAL FIELD

The present disclosure relates to an arrangement structure for devices in a power unit chamber disposed in a front portion of a vehicle.

BACKGROUND

Vehicles include a power unit chamber, also referred to as an engine compartment, in a front portion. The power unit chamber includes, in addition to power units, such as an engine and a motor for travelling, a battery for supplying and receiving electric power to and from the travelling motor, an air cleaner for removing foreign matter from air to be supplied to the engine, and other devices. Patent Document 1, for example, discloses an arrangement structure in which an engine room (power unit chamber) includes an engine in substantially the center, an air cleaner in front of the engine, and a battery beside the engine.

Both the battery and the air cleaner need to be removed from the power unit chamber, as required, for maintenance such as inspection, repair, and replacement, for example. The frequency of maintenance is higher for the air cleaner than for the battery. It is therefore desirable to place the air cleaner in a position which is easier to access than a position of the battery. As the power unit chamber is typically accessed from the front of a vehicle, it is desirable to place the air cleaner in front of the battery in consideration of maintainability. In view of stability of a vehicle, it is desirable to dispose a heavy object, such as a battery, close to the center of a vehicle. Therefore, when the battery and the air cleaner are disposed adjacent to each other in the forward-rearward direction of a vehicle, it is desirable to dispose the battery further rearward in the vehicle than the air cleaner. When the battery and the air cleaner are disposed adjacently in the width direction of a vehicle, it is desirable to dispose the battery more inwardly than the air cleaner in the width direction of the vehicle. As such, to establish both vehicle stability and maintainability, it is desirable that the air cleaner and the battery are disposed adjacently such that the air cleaner is disposed further forward, or further outward in the vehicle width direction, and the battery is disposed further rearward or inward in the vehicle width direction.

CITATION LIST

Patent Document

[PATENT DOCUMENT 1] JP H06-239148 A

SUMMARY

Technical Problem

A cover such as a cowl is disposed above the power unit chamber to partially cover the power unit chamber. In certain types of vehicles, the cover may protrude forward beyond the rear end of the air cleaner. When the battery and the air cleaner are disposed adjacently in the vehicle forward-rearward direction such that the battery is located behind the air cleaner in these types of vehicles, proper maintenance of the battery may be prohibited. Specifically, in order to remove the battery from the power unit chamber in these vehicles, it is necessary to allow the battery to pass through the space formed between the air cleaner and the cover. However, conventional vehicles tend to have a space between the air cleaner and the cover, having a dimension smaller than a dimension of the battery, which makes it difficult to remove the battery forward. As such, when a vehicle includes a cover which protrudes forward beyond the rear end of the air cleaner, it is difficult to dispose the battery behind the air cleaner, resulting in impairment of stability of a vehicle or maintainability. The same problem similarly arises when the battery and the air cleaner are disposed adjacently in the vehicle width direction.

Solution to Problem

The present specification therefore discloses an arrangement structure for vehicle devices that establishes both vehicle stability and maintainability of an air cleaner and a battery, in a vehicle having a cover which protrudes forward beyond the rear end of the air cleaner or protrudes outward in the width direction beyond the inward end in the width direction.

In accordance with one aspect, an arrangement structure for vehicle devices in a power unit chamber of a vehicle, includes an air cleaner disposed in the power unit chamber; a battery disposed adjacently to and behind the air cleaner in the vehicle; and a cover disposed above the battery and the air cleaner. The cover has a front end that is located further forward of the vehicle than a rear end of the air cleaner, and the cover and the air cleaner define a space having a minimum dimension that is greater than a height of the battery.

This structure, which provides a space having a minimum dimension greater than the height of the battery between the cover and the air cleaner, allows an operator to reliably remove the battery which is disposed behind the air cleaner. This results in simultaneous establishment of stability of a vehicle and maintainability of the air cleaner and the battery, even when a vehicle includes a cover which protrudes forward beyond the rear end of the air cleaner.

In this case, the top surface of the air cleaner may be inclined so as to have a greater height toward a front portion of the vehicle.

This structure prevents a reduction in the volume of the air cleaner while securing a sufficient space between the cover and the air cleaner.

The top surface of the air cleaner may have an inclination angle that is equal to or less than a predetermined allowable inclination angle of the battery.

This structure regulates inclination of the battery to the inclination angle or less when the battery is placed on the top surface of the air cleaner during the course of removal of the battery. This prevents liquid leakage from the battery, for example.

The air cleaner may include a cleaner cover covering the top surface of the air cleaner. The cleaner cover may be inclined so as to have a greater height toward the front portion of the vehicle.

The cleaner cover allows the battery to be placed stably on and slide along the top surface of the air cleaner. The cleaner cover further makes it more unlikely that a protruding member such as an air flowmeter disposed on the upper portion of the body of the air cleaner will hit the battery, preventing deterioration of and damage to the air cleaner.

The cleaner cover may include one or more grooves and ridges extending from a rear end toward a front end of the cleaner cover.

This structure decreases a contact area between the cleaner cover and the battery placed on the cleaner cover, reducing resistance generated when the battery is drawn along the cleaner cover. This structure therefore enables the operator to pull the battery up and forward with a smaller force.

The height from the mounting surface for the battery to a rear end and an upper end of the air cleaner may be smaller than a depth of the battery, that is a dimension of the battery in a forward-rearward direction of the vehicle.

This structure allows the battery to be placed on the top surface of the air cleaner without completely lifting up the battery (without lifting the battery in the air), thereby reducing a force required for removing the battery and reducing the burden on the operator.

When a front end of the battery is placed on the rear end of the top surface of the air cleaner, the battery may have an inclination angle that is equal to or less than a predetermined allowable inclination angle of the battery.

This structure prevents the battery from being inclined by an angle greater than the allowable inclination angle, when the battery is placed on the top surface of the air cleaner. This structure further effectively prevents liquid leakage from the battery, for example.

The battery may be disposed such that an upper end of a front end surface of the battery is located above the extension plane that is an extended plane of the top surface of the air cleaner extended toward a rear portion of the vehicle.

This structure increases visibility of the front end surface of the battery, facilitating access to the front end surface.

In accordance with another aspect of the present disclosure, an arrangement structure for vehicle devices in a power unit chamber of a vehicle, includes an air cleaner disposed in the power unit chamber; a battery disposed inward of the air cleaner in a width direction of the vehicle, and disposed adjacently to the air cleaner; and a cover disposed above the battery and the air cleaner. The cover has an outward end in a width direction of the vehicle, the outward end of the cover being located further outward in the width direction of the vehicle than an inward end of the air cleaner in the width direction of the vehicle, and a space between the cover and the air cleaner has a minimum dimension that is greater than a height of the battery.

This structure, including a space between the cover and the air cleaner that has the minimum dimension greater than the height of the battery, allows the battery, even when disposed further inward in the width direction than the air cleaner, to be reliably removed. Consequently, in a vehicle having a cover protruding outward in the width direction beyond the inward end portion of the air cleaner in the width direction, both stability of the vehicle and maintainability of the air cleaner and the battery can be established simultaneously.

The arrangement structure for vehicle device-s disclosed in the present specification provides a space between the cover and the air cleaner having the minimum dimension greater than the height of the battery. This structure allows the battery, even when disposed further inward in the width direction than the air cleaner, to be reliably removed. Consequently, in a vehicle having a cover protruding outward in the width direction beyond the inward end portion of the air cleaner in the width direction, both stability of the vehicle and maintainability of the air cleaner and the battery can be established simultaneously.

BRIEF DESCRIPTION OF DRAWINGS

Embodiment(s) of the present disclosure will be described based on the following figures, wherein.

DESCRIPTION OF EMBODIMENTS

Figure 1:
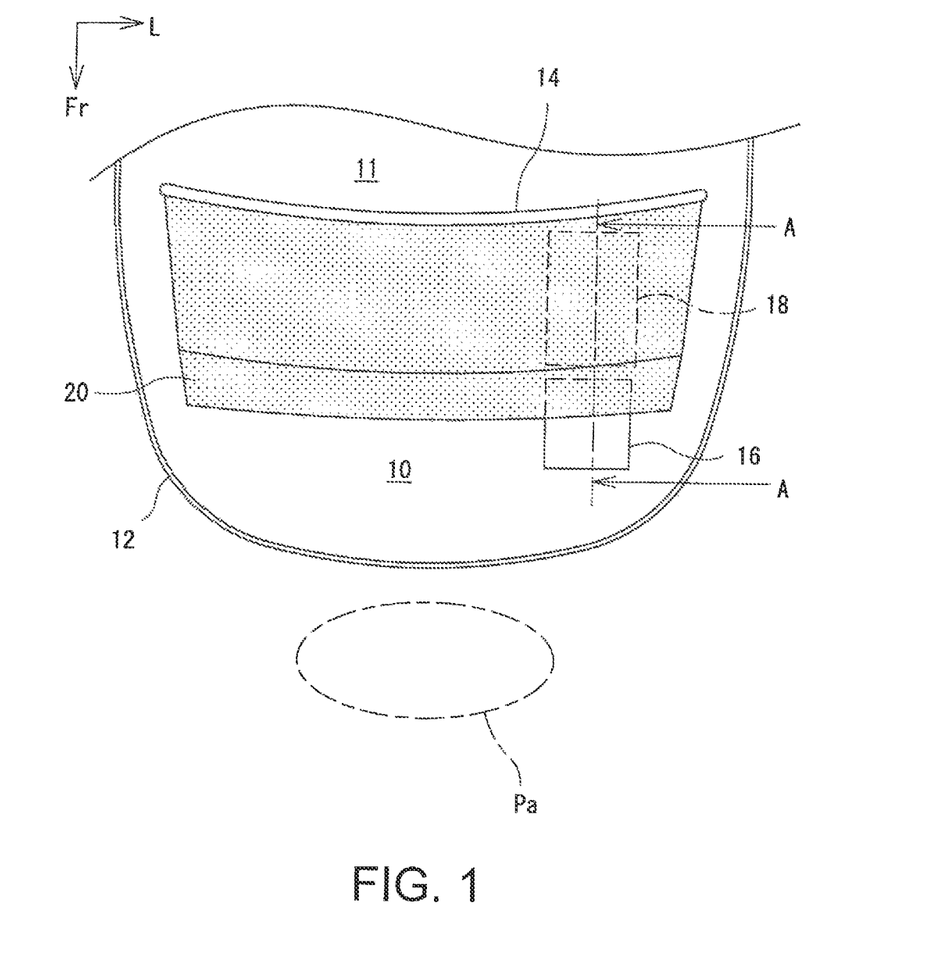
FIG. 1 is a diagram schematically illustrating a front portion of a vehicle.

An arrangement structure for vehicle devices in a power unit chamber 10 will be described with reference to the drawings. FIG. 1 schematically illustrates a front portion of a vehicle. A vehicle includes the power unit chamber 10 in the front portion. The power unit chamber 10 is a space which is also sometimes referred to as an engine room or an engine compartment, and is enclosed by a front panel 12 and a dash cloth panel 14. The power unit chamber 10 includes power units for generating travelling power of the vehicle, such as an engine and a travelling motor (both not shown), for example. The power unit chamber 10 further includes a battery 18 for supplying and receiving electric power to and from the travelling motor, and an air cleaner 16 for removing foreign matter from the air to be supplied to the engine.

The battery 18 having a substantially rectangular parallelepiped shape, is relatively large and heavy. The battery 18, which is a secondary battery capable of charging and discharging, supplies and receives electric power to and from the travelling motor (which also functions as a generator). The battery 18 is removed from the power unit chamber 10, as required, for maintenance such as inspection, repair, and replacement.

The air cleaner 16, which is disposed in the middle, of an in-take passage for supplying air to the engine, removes foreign matter from the air externally taken in and supplies the air to the engine. The air cleaner 16 includes a filter for removing foreign matter from the air. It is necessary to change the filter at regular intervals. Therefore, the air cleaner 16 also need to be removed from the power unit chamber 10 for maintenance. Typically, maintenance of the air cleaner 16 (removal from the power unit chamber 10) is performed more often than maintenance of the battery 18.

In the example illustrated in FIG. 1, in consideration of arrangement of other devices, the battery 8 and the air cleaner 16 are disposed adjacently in the vehicle forward-rearward direction within the power unit chamber 10, and more specifically, in the left side area of the power unit chamber 10. In this arrangement, as illustrated in FIG. 1, the air cleaner 16 is disposed further forward in the vehicle than the battery 18 in order to enhance maintainability and stability of the vehicle. This will be described in detail below.

An upper portion of the power unit chamber 10 is partially covered with a cover 20. The cover 20 extends from near the upper edge of the dash cloth panel 14 (a bulkhead between a passenger compartment 11 and the power unit chamber 10) toward the front portion of the vehicle, and is typically referred to as a cowl. In the example illustrated in FIG. 1, the front end of the cover 20 is located forward beyond the rear end of the air cleaner 16, and the air cleaner 16 and the cover 20 partially overlap with each other in a plan view.

When the air cleaner 16 and the cover 20 partially overlap with each other in a plan view as described above, to establish both maintainability and stability of the vehicle, the arrangement structure of the present disclosure includes the air cleaner 16 and the cover 20 such that the distance between the air cleaner 16 and the cover 20 satisfies a predetermined condition. This will be described below.

As described above, in the present example, the air cleaner 16 and the battery 18 are disposed adjacently in the vehicle forward-rearward direction such that the air cleaner 16 is located in front of the battery 18. This arrangement is adopted for the following reasons: while both the air cleaner 16 and the battery 18 need to be removed from the power unit chamber 10 for maintenance, as required, this removal (maintenance) is performed more often for the air cleaner 16 than for the battery 18. Therefore, placing the air cleaner 16, which is removed more often, at a position which is easier to access than a position of the battery 18 enhances maintainability, To remove the air cleaner 16 and the battery 18, an operator typically stands in front of the vehicle to access the power unit chamber 10. In the following description, this position of the operator is referred to as an "access position Pa". As a device located closer to this access position Pa is easier to remove, in the present embodiment, the air cleaner 16 which is removed more often is disposed further forward (closer to the access position Pa) in the vehicle than the battery 18. This arrangement achieves easier removal of the air cleaner 16 to thereby enhance maintainability.

The battery 18 is much heavier than the air cleaner 16. Placing such a heavy object near the center of a vehicle increases stability of the vehicle. In this embodiment, the battery 18, which is a heavy object, is disposed behind the air cleaner 16 (toward the back seen from the access position Pa), which increases stability of the vehicle.

As described above, disposing the air cleaner 16 and the battery 18 adjacently in the vehicle forward-rearward direction such that the air cleaner 16 is located further forward in the vehicle than the battery 18 enhances maintainability and also stability of the vehicle. However, when the cover 20 extends forward to the middle of the air cleaner 16 in the vehicle, as illustrated in FIG. 1, maintainability of the battery 18 may have been impaired.

More specifically, it is also necessary to remove the battery 18 from the power unit chamber 10 as required, although the frequency of removal of the battery 18 is less than that of the air cleaner 16. When the cover 20 is located above the air cleaner 16, to remove the battery 18 out of the power unit chamber 10 it is necessary to allow the battery 18 to pass through the space between the cover 20 and the air cleaner 16. In this case, the space between the cover 20 and the air cleaner 16, having a small dimension, prevents the battery 18 from passing through the space and therefore prevents the battery 18 from being removed from the power unit chamber 10.

Figure 2:
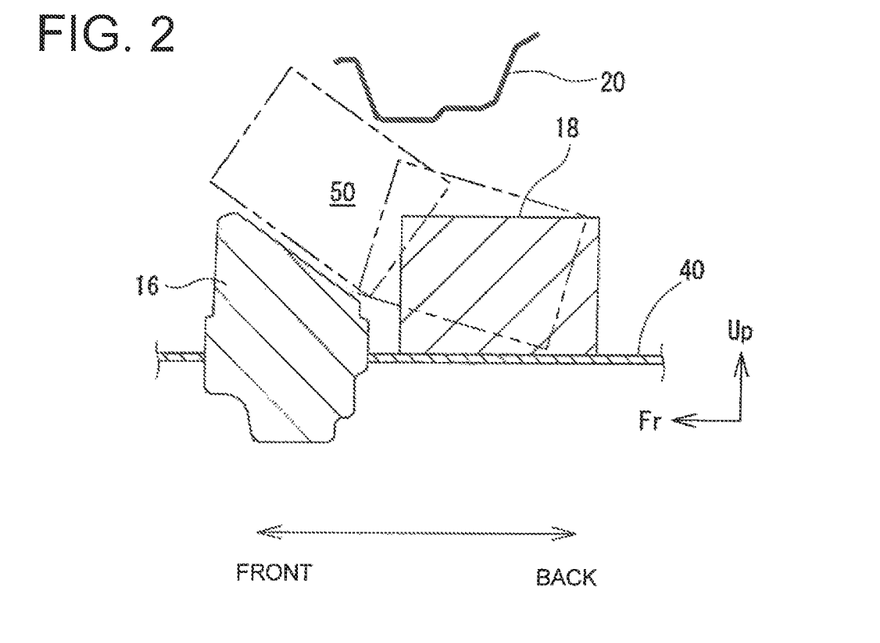
FIG. 2 is a cross sectional view taken along line A-A in FIG. 1.
Figure 3:
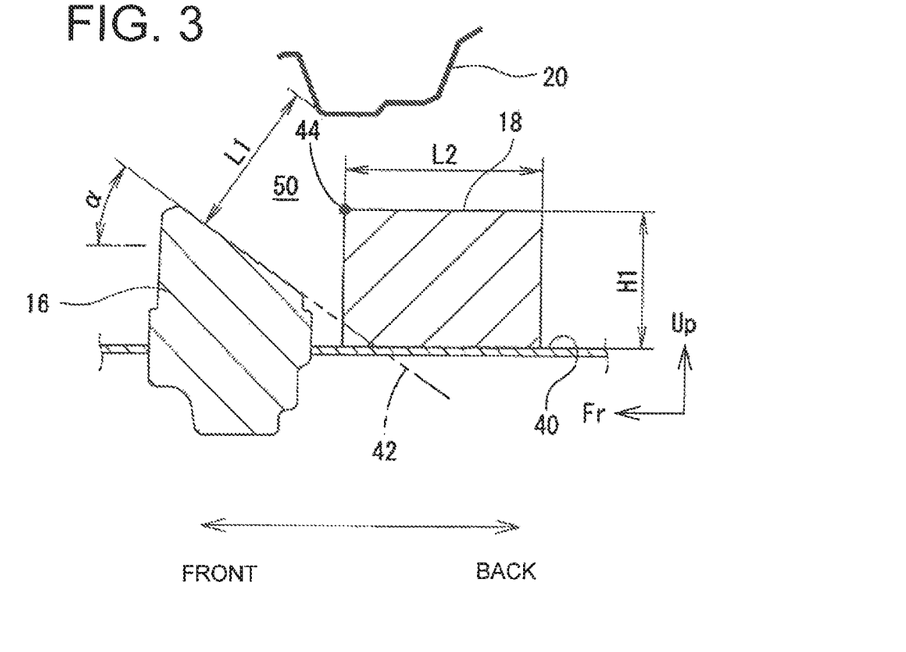
FIG. 3 is a cross sectional view for explaining the dimension of each device.
Figure 4:
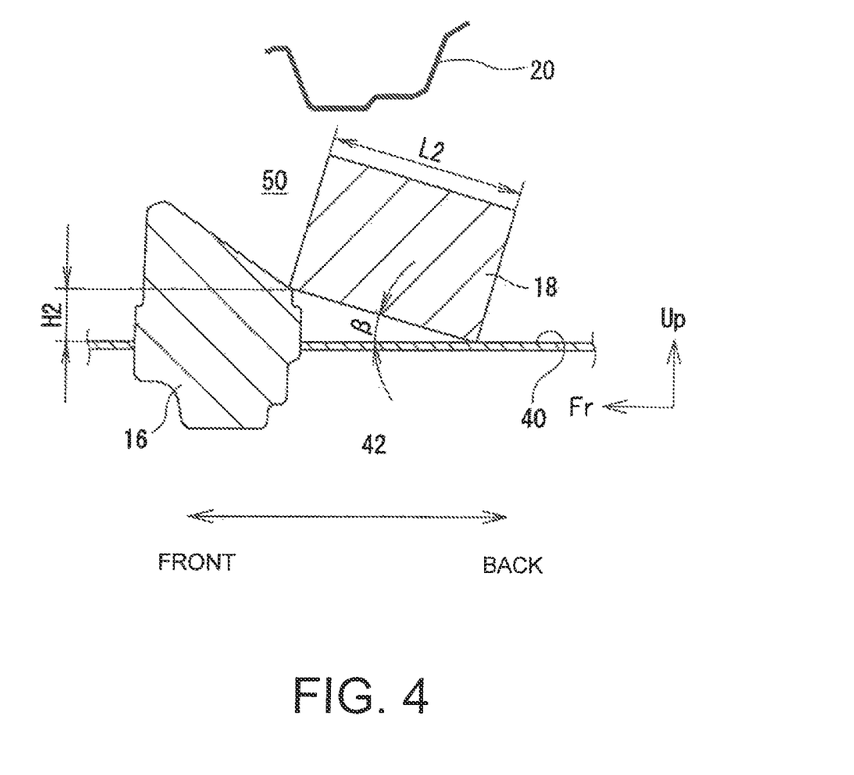
FIG. 4 is a cross sectional view for explaining the dimension of each device.

To allow passage of the battery 18, the present embodiment sets the minimum dimension of the space between the air cleaner 16 and the cover 20 (hereinafter referred to as a "passing space 50") to be equal to or greater than the height of the battery 18. This will be described with reference to FIG. 2 to FIG. 4. FIG. 2 is a cross sectional view taken along line A-A in FIG. 1, and FIGS. 3 and 4 are cross sectional views for explaining the dimension of each device.

As stated above, in the present embodiment, the air cleaner 16 and the battery 18 are disposed adjacently in the vehicle forward-rearward direction such that the air cleaner 16 is disposed further forward (closer to the access position Pa) than the battery 18 in the vehicle. To remove the battery 18 from the power unit chamber 10, the operator extends their hands into the space (passing space 50) between the cover 20 and the air cleaner 16 to hold the front end of the battery 18 and pull the battery 18 forward. At this time, as indicated by the dashed and double-dotted line in FIG. 2, the battery 18 passes through the passing space 50. To allow this passage of the battery 18, in the present embodiment, the passing space 50 formed between the air cleaner 16 and the cover has a minimum dimension L1 which is set to be greater than the height H1 of the battery 18 (L1>H1; see FIG. 3). These dimensions enable the operator to reliably remove the battery 18, which may be disposed further backward in the vehicle than the air cleaner 16, thereby enhancing both stability of the vehicle and maintainability.

As the battery 18 is heavy, completely lifting and pulling the battery 18 forward (lifting the battery 18 in the air and pulling) to remove the battery 18 places a heavy burden on the operator. The operator therefore typically places the battery 18 onto the top surface of the air cleaner 16 before drawing the battery 18 forward. This significantly reduces the power required for removing the battery 18.

While the minimum dimension L1 of the passing space 50 may be increased by reducing the size of the air cleaner 16, to secure a sufficient flow rate of the air to be supplied to the engine, the air cleaner 16 needs to have a certain volume and should not be excessively downsized. In the present embodiment, to increase the minimum dimension L1 of the passing space 50 while preventing a reduction in the volume of the air cleaner 16, the air cleaner 16 has a top surface with a raised front, that is, having a height increasing toward the front of the vehicle. This will be described below with reference to FIG. 5, which is a perspective view of the air cleaner 16.

Figure 5:
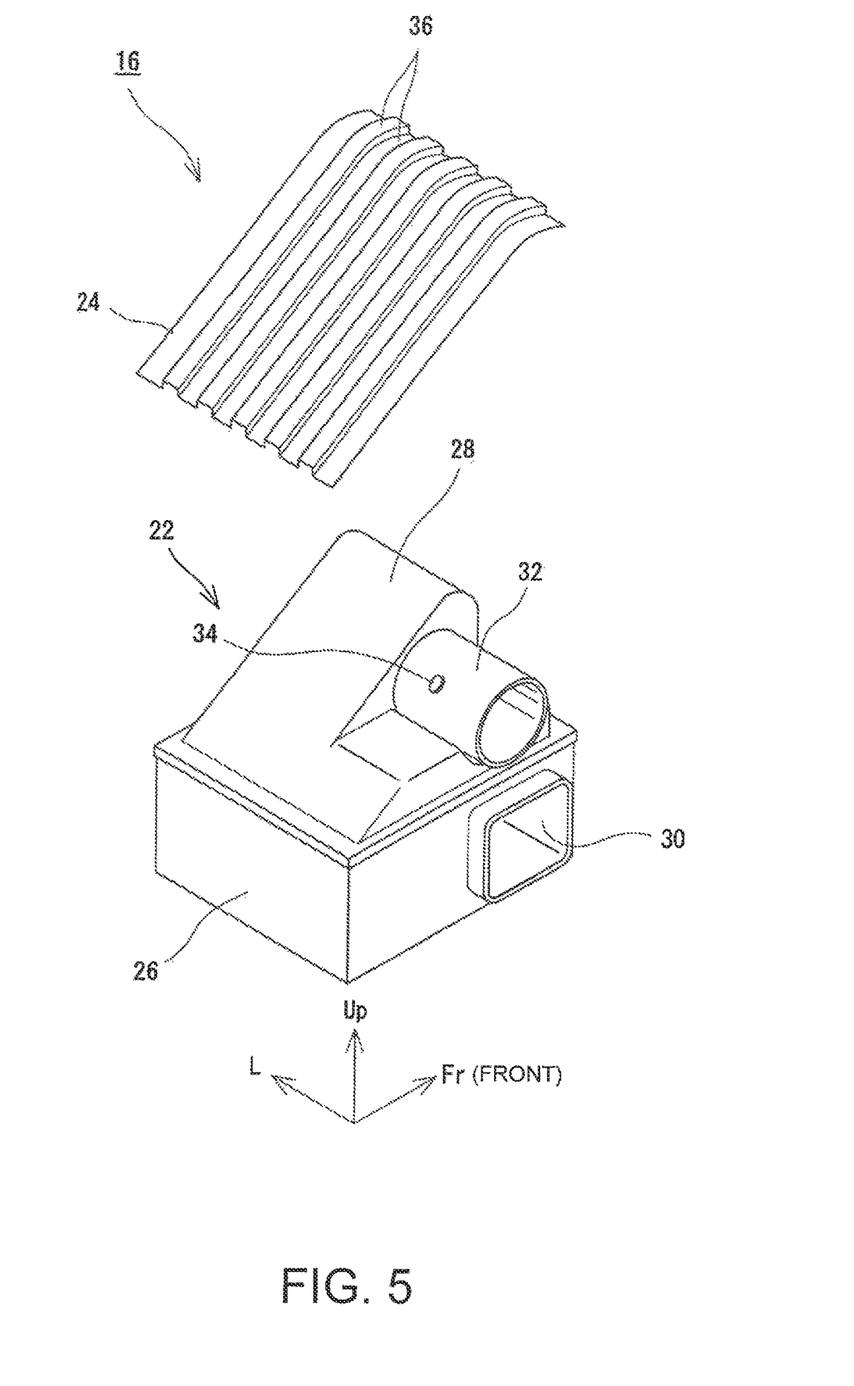
FIG. 5 is a perspective view of an air cleaner.

The air cleaner 16 includes a body part 22 and a cleaner cover 24 covering the top surface of the body part 22, as illustrated in FIG. 5. The body part 22 includes a case 26 of a substantially rectangular parallelepiped and a cap 28 covering top surface of the case 26. The case 26 and the cap 28 are assembled air-tightly to form an air flow channel, within the body part 22, through which air flows. The body part 22 includes a filter that removes foreign matter from the incoming air.

The case 26 includes an inlet pipe 30 projecting from a right end surface into communication with the air flow passage. The inlet pipe 30 is connected to an intake duct (not shown) into which external air flows. An outlet pipe 32 protrudes from a right end surface of the cap 28. Both the inlet pipe 30 and the outlet pipe 32 are located on the forward part of the vehicle such that the inlet pipe 30 and the outlet pipe 32 are aligned vertically. The outlet pipe 32 communicates with the engine via an intake pipe (not shown). The outlet pipe 32 includes an air flowmeter 34 for measuring the amount of flowing air.

To secure the sufficient flow rate, the outlet pipe 32 and the inlet pipe 30 need a certain degree of height. In the present embodiment, the outlet pipe 32 and the inlet pipe 30 are both disposed toward the front portion of the vehicle, as illustrated in FIG. 5. The top surface of the body part 22 of the air cleaner 16 therefore has a height which increases toward the front part of the vehicle. The air cleaner 16 having such a raised-front shape of the top surface provides a body required for maintaining the sufficient flow rate while securing the sufficient passing space 50.

The top surface of the body part 22 is covered with the cleaner cover 24. The cleaner cover 24 is a sheet member made of a material having a certain degree of shape retention properties, such as a resin and metal. The cleaner cover 24 is fixed to the top surface of the body part 22 with various fixing means (such as fastening by a bolt). The cleaner cover 24, when fixed to the top surface of the body part 22, is inclined so as to have a height increasing toward the front. To remove the battery 18 from the power unit chamber, the battery 18 is placed on the air cleaner 16 for sliding, as described above. In this case, the cleaner cover 24 covering the top surface of the air cleaner 16 allows stable placement and slide of the battery 18 on the air cleaner 16. The body part 22 of the air cleaner 16 includes a partially protruding member such as the air flowmeter 34 on the top surface. The cleaner cover 24 prevents contact of such a protruding member with the battery 18, thereby avoiding deterioration and damage of the protruding member (air flowmeter 34).

The cleaner cover 24 includes a plurality of grooves and ridges 36 extending from the rear end toward the front end. These grooves and ridges 36 reduce a contact area between the cleaner cover 24 and the battery 18 plated on the cleaner cover 24, thereby reducing the resistance generated by sliding the battery 18 from the rear to the front.

Typically, the battery 18, which is a secondary battery, includes an electrolytic solution, and excessive inclination of the battery 18 may result in leakage of this electrolytic solution (liquid leakage). Therefore, batteries normally have an inclination angle which is allowable for preventing liquid leakage (hereinafter referred to as "allowable inclination angle $\omega$"). For example, when the battery 18 has an allowable inclination angle $\omega$ of 35 degrees, the battery 18 is inhibited from being inclined in excess of 35 degrees.

As described above, the battery 18 is placed on and drawn along the top surface of the air cleaner 16 for removal. At this time, the inclination angle of the battery 18 is equal to the inclination angle $\alpha$ of the top surface of the air cleaner 16 (see FIG. 3). To avoid liquid leakage from the battery 18, the inclination angle $\alpha$ of the top surface of the air cleaner 16 is set to be equal to or less than the allowable inclination angle $\omega$ of the battery 18. For example, when the allowable inclination angle $\omega$ of the battery 18 is 35 degrees, the inclination angle $\alpha$ of the top surface of the air cleaner 16 is set to be equal to or less than 35 degrees.

To place the battery 18 on the top surface of the air cleaner 16, the front end of the battery 18 is placed on the rear end of the air cleaner 16, as illustrated in. FIG. 4. The dimensions of the battery 18 and the air cleaner 16 are set such that the inclination angle $\beta$ of the battery 18 at this time does not exceed the allowable inclination angle $\omega$. More specifically, assuming that the length from the mounting surface 40 for the battery 18 to the upper end of the rear end of the air cleaner 16 is a "cleaner ear end height H2", and the dimension in the forward-rearward direction of the battery 18 is a "battery depth L2", the inclination angle $\beta$ is $\beta=\arcsin(H2/L2)$. Therefore, the cleaner rear end height H2 and the battery depth L2 are set to satisfy $\arcsin(H2/L2)<\omega$.

Further, as the battery 18 is heavy, completely lifting up the battery 18 places a heavy burden on the operator. Therefore, to remove the battery 18, it is desirable to draw up the battery 18 with at least a part of the bottom surface of the battery 18 being in contact with the mounting surface 40 or the top surface of the air cleaner 16.

Figure 7:
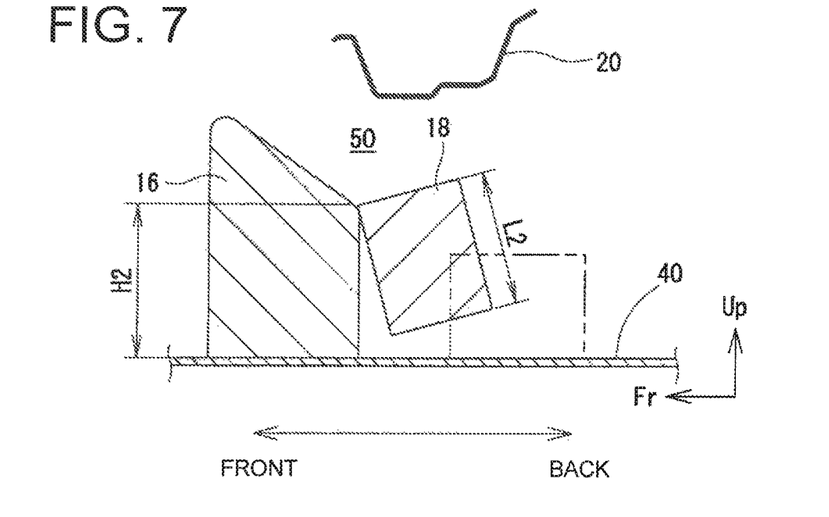
FIG. 7 is a cross sectional view illustrating another example arrangement structure.

When the cleaner rear end height H2 is greater than the battery depth L2, as illustrated in FIG. 7, the operator must lift the battery 18 completely (lift the battery 18 in the air) to remove the battery 8, which imposes a great burden on the operator. The cleaner rear end height H2 and the battery depth L2 are therefore set to be H2<L2. In consideration of the operator's burden, it is desirable that the relationship between the cleaner rear end height H2 and the battery depth L2 satisfy H2<L2. However, the relationship may be H2>L2 if at least the relationship H1<L1 is satisfied. Therefore, the embodiment illustrated in FIG. 7 may be acceptable.

Figure 8:
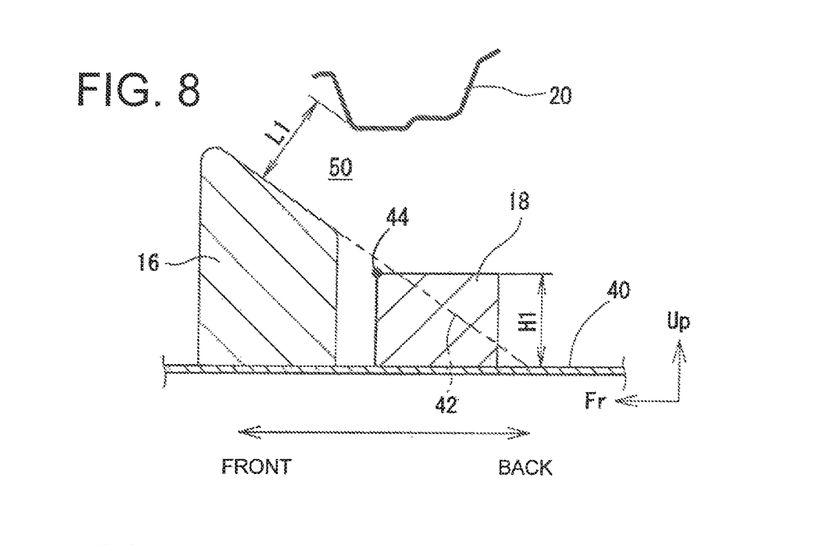
FIG. 8 is a cross sectional view illustrating another example arrangement structure.

To facilitate removal of the battery 18, it is desirable that the front end surface of the battery 18 can be easily recognized visually and easily accessed. In other words, when the upper edge 44 of the front end surface of the battery 18 is located below an extended plane 42, and an extended plane of the upper end surface of the air cleaner 16 extended toward the rear portion of the vehicle, as illustrated in FIG. 8, it is difficult to visually recognize the front end surface of the battery 18 and to access (grip, for example) the front end surface. It is therefore desirable to set the arrangement and dimension of the battery 18 such that the upper edge 44 of the front end surface of the battery 18 is located above the extended plane 42 of the upper end surface of the air cleaner 16, as illustrated in FIG. 3. While it is desirable that the upper edge 44 of the front end surface of the battery 18 is located above the extended plane 42 to facilitate the operation, the upper edge 44 may be located below the extended plane 42 if the relationship H1<L1 is satisfied. Therefore, the embodiment illustrated in FIG. 8 may be acceptable.

As described above, disposing the battery 18 and the air cleaner 16 adjacently such that the battery 18 is located at the back of the air cleaner 16 and setting the minimum dimension L1 of the passing space 50 to be greater than the height H1 the battery 18 increases stability of the vehicle and also enhances maintainability of the battery 18 and the air cleaner 16. Further, the top surface of air cleaner 16 which is inclined so as to have an increased height toward the front sufficiently secures the passing space 50 while avoiding downsizing of the air cleaner.

Figure 6:
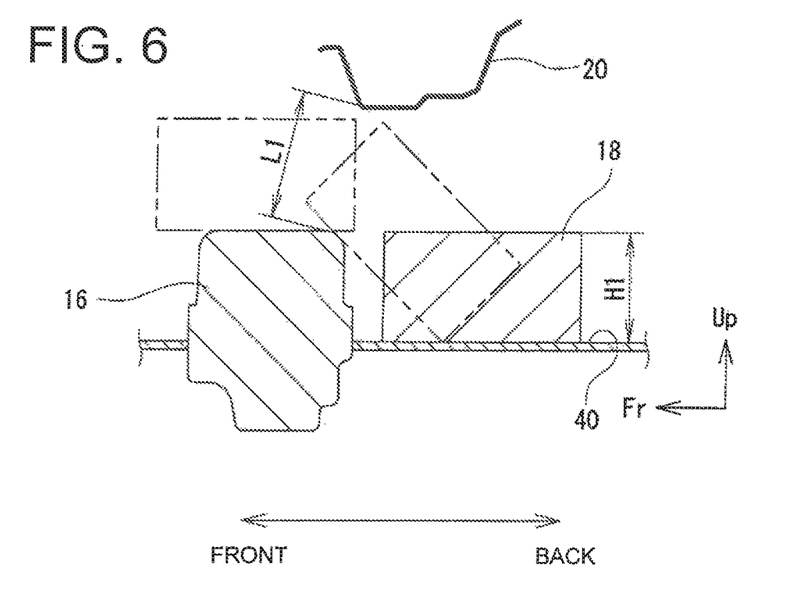
FIG. 6 is a cross sectional view illustrating another example arrangement structure.

The structures described above are only examples and may be modified as appropriate if at least the minimum dimension L1 of the space (passing space 50) between the air cleaner 16 and the cover 20 is greater than the height H1 of the battery 18. For example, while in the above description the cleaner cover 24 is disposed on the top surface of the air cleaner 16, the cleaner cover 24 may be omitted if the battery 18 is disposed and slides stably on the air cleaner 16. Further, while in the above description the top surface of the air cleaner 16 is inclined so as to have a raised-front shape, the top surface of the air cleaner 16 may be flat as illustrated in FIG. 6 if the minimum dimension L1 of the passing space 50 is greater than the height H1 of the battery 18.

Figure 9:
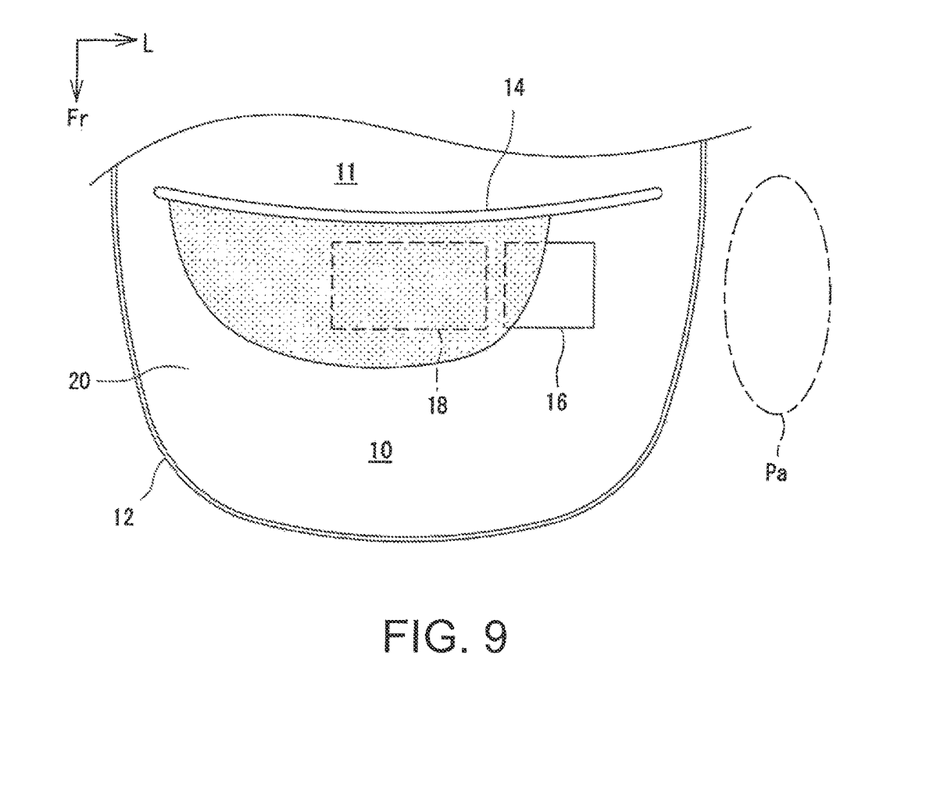
FIG. 9 is a diagram illustrating another example arrangement structure.

Further, while the above description includes an example in which the devices are accessed from the front portion of a vehicle, the structure disclosed in the present specification may be applied to vehicles in which the devices are accessed from other locations. For example, a vehicle illustrated in FIG. 9 includes the air cleaner 16 and the battery 18 which are disposed adjacently in the width direction of the vehicle, and the air cleaner 16 and the battery 18 can be accessed only from the left side of the power unit chamber 10 due to the cover 20 and other devices. In this example, the air cleaner 16 and the battery 18 are disposed adjacently in the vehicle width direction such that the air cleaner 16 with a higher maintenance frequency is located further left of the vehicle (further outward of the vehicle; closer to an access position Pa) than the battery 18, or the battery 18 is located further right of the vehicle (further inward of the vehicle) than the air cleaner 16. The dimensions of the devices are further set such that the minimum dimension of the passing space 50, which is a space between the air cleaner 16 and the cover 20, is greater than the height of the battery 18. This structure allows both the battery 18 and the air cleaner 16 to be removed easily, thereby enhancing maintainability.

The invention claimed is:

1. An arrangement structure for vehicle devices in a power unit chamber of a vehicle, the arrangement structure comprising:
    an air cleaner disposed in the power unit chamber;
    a battery disposed adjacently to and behind the air cleaner in the vehicle; and
    a cover disposed above the battery and the air cleaner, wherein
    the cover has a front end that is located further forward of the vehicle than a rear end of the air cleaner, and
    the cover and the air cleaner define a space having a minimum dimension that is greater than a height of the battery.

2. The arrangement structure for vehicle devices according to claim 1, wherein
    the air cleaner has a top surface that is inclined so as to have a greater height toward a front portion of the vehicle.

3. The arrangement structure for vehicle devices according to claim 2, wherein
    the top surface of the air cleaner has an inclination angle that is equal to or less than a predetermined allowable inclination angle of the battery.

4. The arrangement structure for vehicle devices according to claim 2, wherein
    the air cleaner includes a cleaner cover covering the top surface of the air cleaner, the cleaner cover being inclined so as to have a greater height toward the front portion of the vehicle.

5. The arrangement structure for vehicle devices according to claim 4, wherein
    the cleaner cover includes one or more grooves and ridges extending from a rear end toward a front end of the cleaner cover.

6. The arrangement structure for vehicle devices according to claim 1, wherein
    a height from a mounting surface for the battery to a rear end and an upper end of the air cleaner is smaller than a depth of the battery, that is a dimension of the battery in a forward-rearward direction of the vehicle.

7. The arrangement structure for vehicle devices according to claim 1, wherein
    when a front end of the battery is placed on the rear end of the top surface of the air cleaner, the battery has an inclination angle that is equal to or less than a predetermined allowable inclination angle of the battery.

8. The arrangement structure for vehicle devices according to claim 1, wherein
    the battery is disposed such that an upper end of a front end surface of the battery is located above an extension plane that is an extended plane of the top surface of the air cleaner extended toward a rear portion of the vehicle.

9. An arrangement structure for vehicle devices in a power unit chamber of a vehicle, the arrangement structure comprising:
    an air cleaner disposed in the power unit chamber;
    a battery disposed inward of the air cleaner in a width direction of the vehicle, the battery being disposed adjacently to the air cleaner; and
    a cover disposed above the battery and the air cleaner, wherein
    the cover has an outward end in a width direction of the vehicle, the outward end of the cover being located further outward in the width direction of the vehicle than an inward end of the air cleaner in the width direction of the vehicle, and
    a space between the cover and the air cleaner has a minimum dimension that is greater than a height of the battery.

* * * * *